United States Patent
Li (10) Patent No.: US 10,957,503 B2
(45) Date of Patent: Mar. 23, 2021

(54) SINKABLE KEYBOARD DEVICE

(71) Applicant: Chicony Electronics Co., Ltd., New Taipei (TW)

(72) Inventor: Po-Hsin Li, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 47 days.

(21) Appl. No.: 16/577,707

(22) Filed: Sep. 20, 2019

(65) Prior Publication Data

US 2020/0211796 A1  Jul. 2, 2020

(30) Foreign Application Priority Data

Dec. 27, 2018 (TW) ................................ 107147535

(51) Int. Cl.
  *G06F 1/16* (2006.01)
  *H01H 13/86* (2006.01)

(52) U.S. Cl.
  CPC .......... *H01H 13/86* (2013.01); *G06F 1/1616* (2013.01); *G06F 1/1666* (2013.01); *H01H 2223/052* (2013.01); *H01H 2233/05* (2013.01)

(58) Field of Classification Search
  None
  See application file for complete search history.

(56) References Cited

U.S. PATENT DOCUMENTS

| | | | | | |
|---|---|---|---|---|---|
| 5,767,464 | A | * | 6/1998 | Dyer | H01H 3/125 200/344 |
| 6,087,966 | A | * | 7/2000 | Sato | G06F 3/023 200/345 |
| 8,314,353 | B2 | * | 11/2012 | Nilsson | H01H 13/705 200/5 A |
| 9,299,513 | B2 | * | 3/2016 | Nakamura | G06F 1/1666 |
| 9,934,916 | B2 | * | 4/2018 | Tamura | H01H 13/705 |
| 9,983,633 | B2 | * | 5/2018 | Tamura | G06F 1/1666 |
| 10,061,396 | B1 | * | 8/2018 | Shibayama | G06F 1/1616 |
| 10,599,187 | B2 | * | 3/2020 | Tamura | G06F 3/0221 |
| 2012/0097511 | A1 | * | 4/2012 | Liu | H01H 3/125 200/5 A |
| 2015/0083562 | A1 | * | 3/2015 | Hsu | H01H 13/14 200/344 |

(Continued)

*Primary Examiner* — Anthony Q Edwards
*Assistant Examiner* — Rashen E Morrison
(74) *Attorney, Agent, or Firm* — Muncy, Geissler, Olds & Lowe, P.C.

(57) ABSTRACT

A sinkable keyboard device includes a substrate, a first keycap, a second keycap, and a sliding plate. The substrate has an upper surface. The first keycap is liftably disposed on the upper surface and includes a first abutting portion. The second keycap is liftably disposed on the upper surface and includes a second abutting portion. The sliding plate is parallel to the substrate and movable relative to the upper surface along a sliding direction. The sliding plate includes a first guiding member and a second guiding member arranged along the sliding direction. The first guiding member has a first inclined guiding surface, and a first inclined angle is between the first inclined guiding surface and the upper surface. The second guiding member has a second inclined guiding surface, and a second inclined angle different from the first inclined angle is between the second inclined guiding surface and the upper surface.

10 Claims, 10 Drawing Sheets

(56) References Cited

U.S. PATENT DOCUMENTS

| | | | | |
|---|---|---|---|---|
| 2016/0118206 A1* | 4/2016 | Wu | ................... | H01H 13/7065 |
| | | | | 200/5 A |
| 2019/0377389 A1* | 12/2019 | Tamura | ................... | G06F 1/169 |
| 2020/0211796 A1* | 7/2020 | Li | ......................... | H01H 13/86 |

* cited by examiner

SINKABLE KEYBOARD DEVICE

CROSS-REFERENCE TO RELATED APPLICATION

This non-provisional application claims priority under 35 U.S.C. § 119(a) to Patent Application No. 107147535 filed in Taiwan, R.O.C. on Dec. 27, 2018, the entire contents of which are hereby incorporated by reference.

BACKGROUND

Technical Field

The instant disclosure relates to a keyboard device, in particular, to a sinkable keyboard device.

Related Art

Keyboards are common computer peripheral input devices for inputting texts or commands. In general, a keyboard known to the inventor(s) includes a substrate, several keys assembled on the substrate, and a cover plate on the substrate. The keycap of each of the keys is protruded out of the surface of the cover plate, so that a user can press the keycaps for operation.

SUMMARY

However, for a portable electronic device with a keyboard (e.g., a notebook computer or a tablet computer), when the keyboard is not in use, the keyboard is retracted within the device. For instance, when the keyboard of a notebook computer is not in use, the front cover of the notebook computer with the display are adapted to cover the back cover of the notebook computer with the keyboard, so that the user can bring the notebook computer conveniently. Conversely, when the keyboard of a tablet computer is not in use, the keyboard can be folded or can be moved to the back of the touchscreen of the tablet computer, so that the overall size of the tablet computer can be reduced and the user can place the tablet computer on the desk for operation. Nevertheless, since the keycaps of the keyboard protrude out of the surface of the keyboard case and the keycaps are in a pressable situation, the keycaps are prone to be pressed or worn against by external forces applied to the keycaps after the keyboard is folded or retracted.

In view of this, in one embodiment, a sinkable keyboard device is provided. The sinkable keyboard device comprises a substrate, a first keycap, a second keycap, and a sliding plate. The substrate has an upper surface. The first keycap is liftably disposed on the upper surface of the substrate. The second keycap is liftably disposed on the supper surface of the substrate. The first keycap comprises a first abutting portion. The second keycap comprises a second abutting portion. The sliding plate is parallel to the substrate. The sliding plate is movable relative to the upper surface of the substrate along a sliding direction. The sliding plate comprises a first guiding member and a second guiding member. The first guiding member has a first inclined guiding surface, and a first inclined angle is between the first inclined guiding surface and the upper surface. The second guiding member has a second inclined guiding surface, and a second inclined angle is between the second inclined guiding surface and the upper surface. The first inclined angle is different from the second inclined angle. When the sliding plate slides relative to the substrate along the sliding direction, the first abutting portion of the first keycap abuts against the first inclined guiding surface and slides along the first inclined guiding surface firstly, so that the first keycap moves downwardly to come close to the substrate. Next, the second abutting portion of the second keycap abuts against the second inclined guiding surface and slides along the second inclined guiding surface, so that the second keycap moves downwardly to come close to the substrate.

As above, according to one or some embodiments of the instant disclosure, since the first inclined angle of the first inclined guiding surface of the sliding plate is different from the second inclined angle of the second inclined surface of the sliding plate, the first abutting portion of the first keycap and the second abutting portion of the second keycap abut the first inclined guiding surface and the second inclined guiding surface at different timings. Therefore, the first keycap and the second keycap can be moved toward the substrate at different timings. Accordingly, when the keyboard is not in use, the keycaps are sunk downwardly and not protruding from the surface of the cover plate. Furthermore, according to one or some embodiments of the instant disclosure, the sinkable mechanism of the sinkable keyboard device can be operated with less force.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
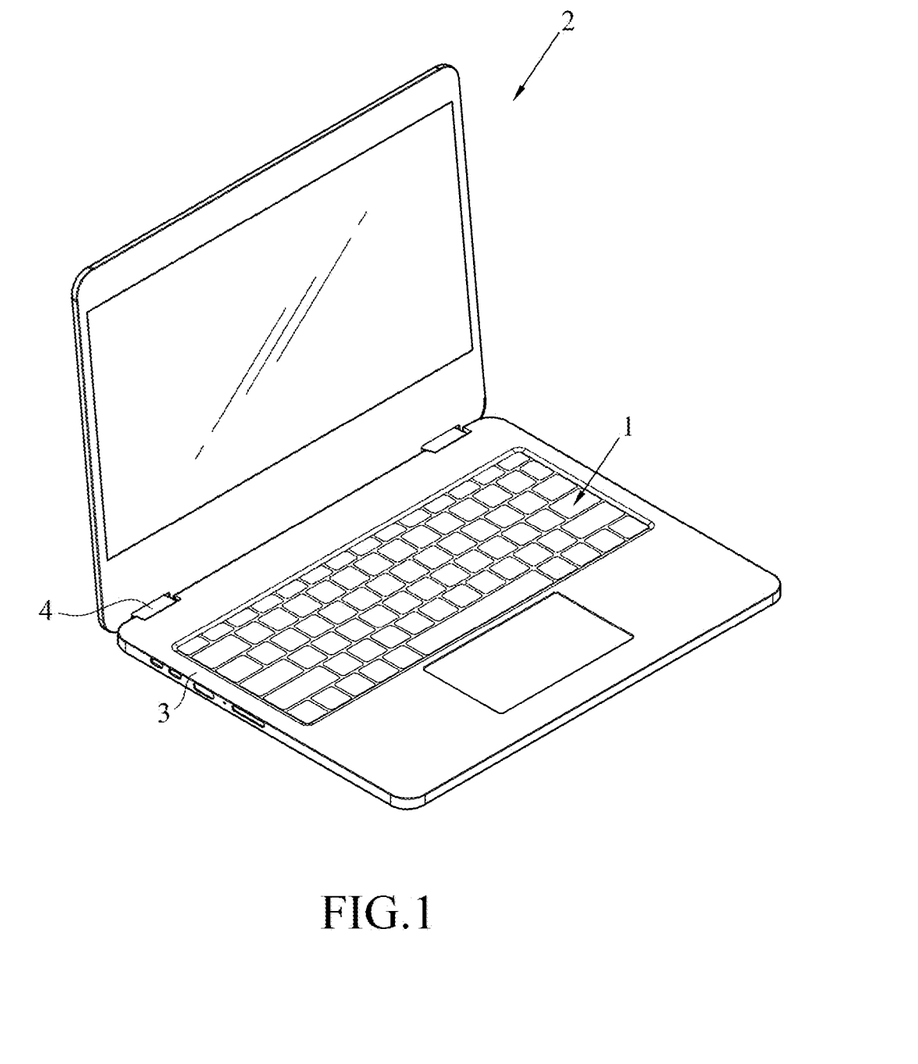
FIG. 1 illustrates a schematic applicational view of a sinkable keyboard device according to an exemplary embodiment of the instant disclosure.
Figure 2:
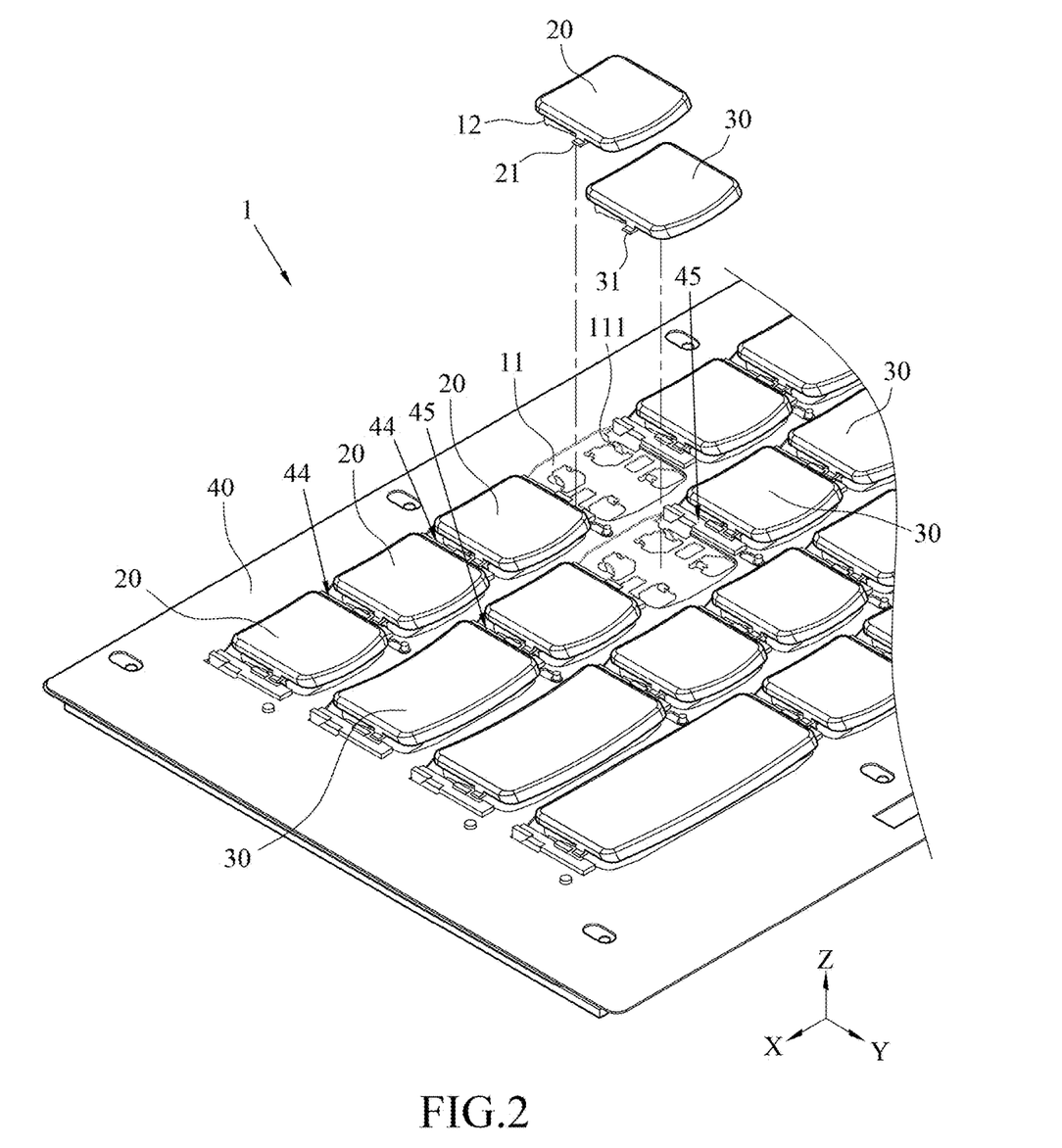
FIG. 2 illustrates a partial perspective view of a sinkable keyboard device according to an exemplary embodiment of the instant disclosure.
Figure 3:
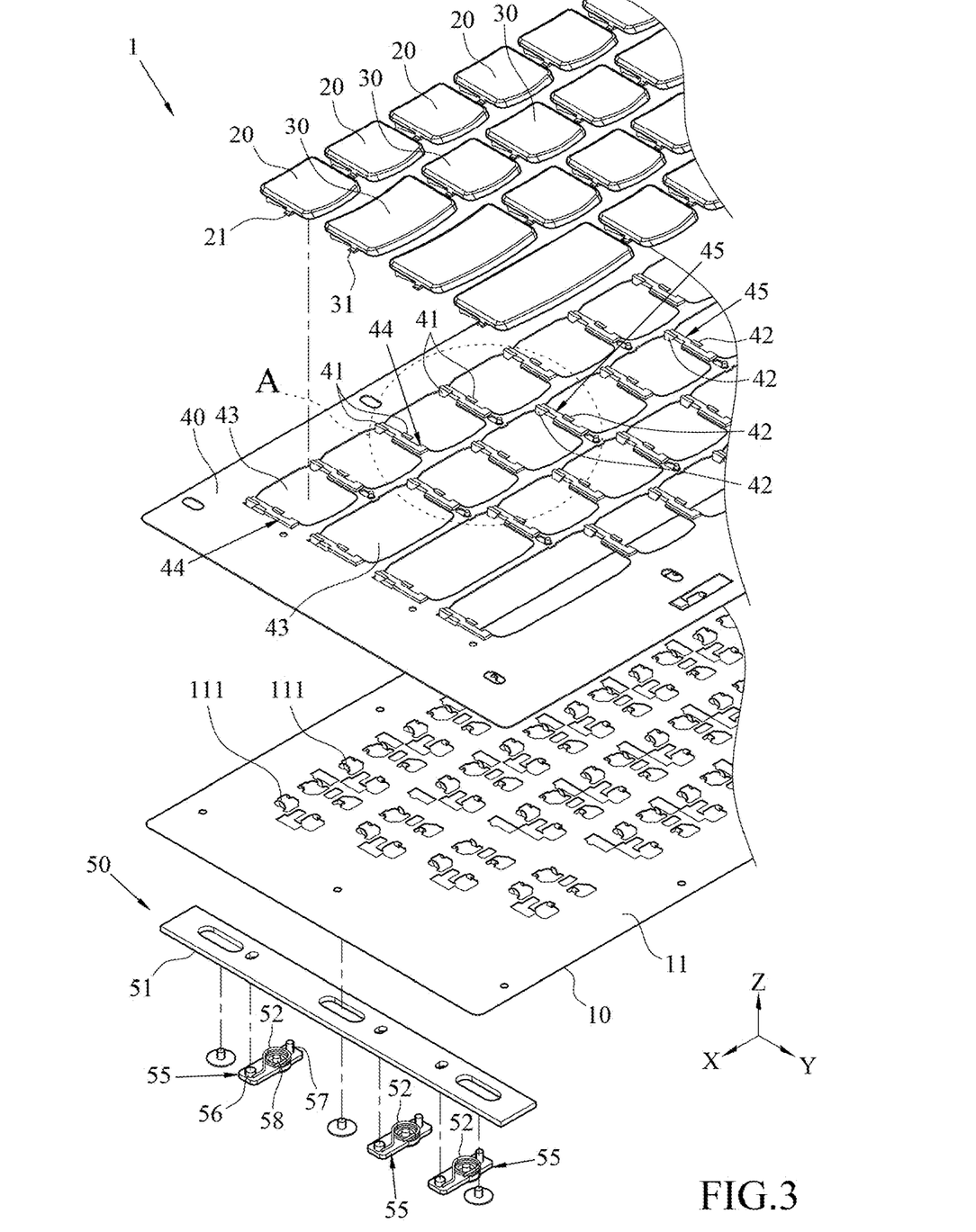
FIG. 3 illustrates a partial exploded view of a sinkable keyboard device according to an exemplary embodiment of the instant disclosure.

Please refer to FIGS. 1 to 4, in this embodiment, a sinkable keyboard device 1 comprises a substrate 10, a plurality of keycaps (for example, the first keycaps 20 and the second keycaps 30 shown in FIGS. 1 to 3), and a sliding plate 40. the keycaps may comprise alphabet keys, number keys, a space key, an enter key, a caps lock key, and so on, so that a user can press the keys and the sinkable keyboard device thus generates signals corresponding to the pressed keys. Furthermore, as shown in FIG. 1, in this embodiment, the sinkable keyboard device 1 is the keyboard of a notebook computer 2, but embodiments are not limited thereto. In some embodiments, the sinkable keyboard device 1 may be the keyboard of a laptop computer or an add-on keyboard for connected to a tablet computer.

As shown in FIGS. 1 to 4, in this embodiment, the keycaps are pressably disposed on the substrate 10, the sliding plate 40 is between the keycaps and the substrate 10, and the sliding plate 40 is movable relative to the substrate 10, so that the sliding plate 40 is adapted to drive the keycaps to move downwardly to come close to the substrate 10. Detailed descriptions are provided as below.

As shown in FIGS. 1 to 4, the substrate 10 has an upper surface 11, and the upper surface 11 may have assembly structures 111 for assembling with the keycaps. In some embodiments, the substrate 10 may be a rigid plate made of metal (e.g., iron, aluminum, alloy, etc.), or plastic materials.

As shown in FIGS. 2 and 3, the sinkable keyboard device 1 has several rows of keycaps; in this embodiment, the sinkable keyboard device 1 has two rows of keycaps, but embodiments are not limited thereto. For example, several first keycaps 20 may be arranged on the substrate 10 along one direction (e.g., the X axis direction shown in FIG. 2), and several second keycaps 30 are also arranged on the substrate 10 along the same direction (e.g., the X axis direction shown in FIG. 2), so that the two rows of keycaps are parallel to each other, but embodiments are not limited thereto. In some embodiments, the first keycaps 20 and the second keycaps 30 may be arranged along another direction (e.g., the Y axis direction). Alternatively, the first keycaps 20 and the second keycaps 30 may be arranged alternately on the substrate 10. Alternatively, the first keycaps 20 and the second keycaps 30 may be arranged at different regions of the substrate 10. For instance, the first keycaps 20 may be arranged on the left portion of the sinkable keyboard device 1, and the second keycaps 30 may be arranged on the right portion of the sinkable keyboard device 1. In some other embodiments, the first keycaps 20 and the second keycaps 30 may be arranged on the substrate 10 irregularly.

Figure 6:
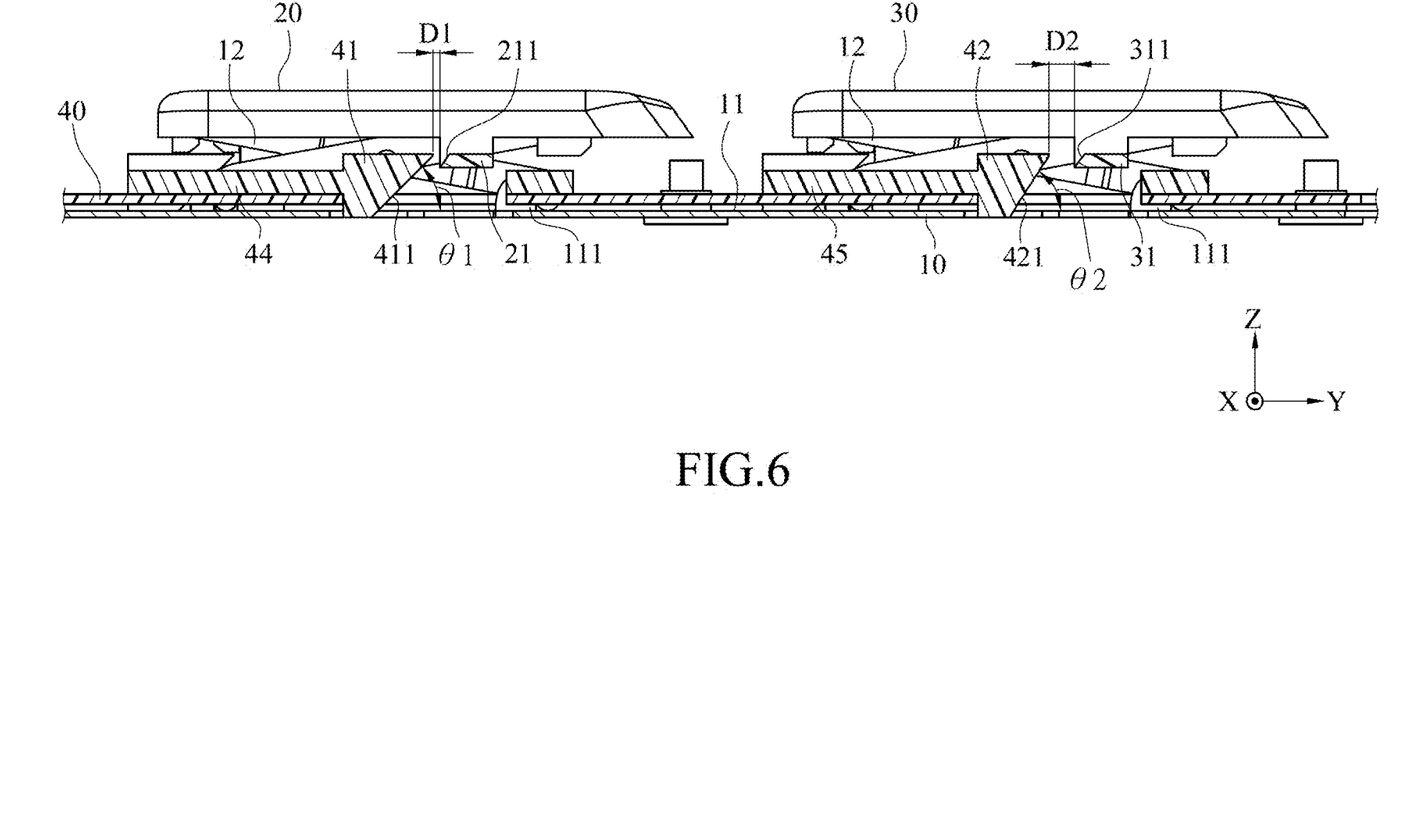
FIG. 6 illustrates a cross-sectional view along line 6-6 shown in FIG. 5.

Furthermore, as shown in FIGS. 2 and 3, the first keycaps 20 and the second keycaps 30 are liftably disposed on the upper surface 11 of the substrate 10. For example, the assembly structures 111 on the upper surface 11 of the substrate 10 may be hook members, and a plurality of liftable connecting members 12 (as shown in FIG. 6) are disposed between each of the first keycaps 20 and the substrate 10 and between each of the second keycaps 30 and the substrate 10. In this embodiment, the liftable connecting members 12 are scissor components. The bottom portion of each of the liftable connecting members 12 may be pivoted with the corresponding assembly structure 111, and the top portion of each of the liftable connecting members 12 may be pivoted with the bottom portion of each of the first keycaps 20 or the bottom portion of each of the second keycaps 30. Therefore, when the first keycap 20 (or the second keycap 30) is pressed, the keycap is moved toward the substrate 10 by the guiding of the corresponding liftable connecting member 12. In some embodiments, the liftable connecting members 12 may be other structures; for example, the liftable connecting members 12 may be mechanical switches or butterfly connecting members.

Figure 5:
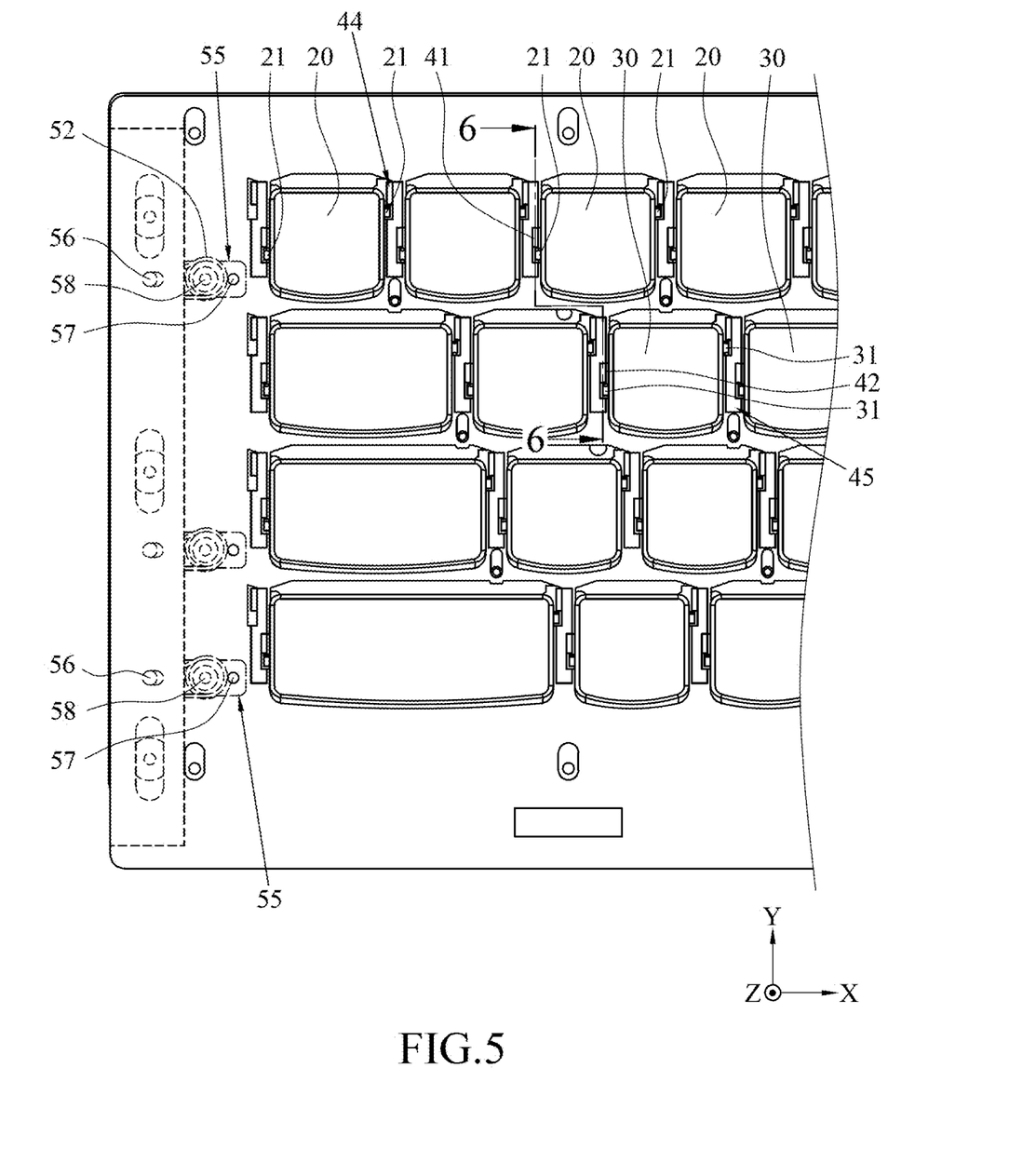
FIG. 5 illustrates a top view of a sinkable keyboard device according to an exemplary embodiment of the instant disclosure.

Furthermore, as shown in FIGS. 2, 3, and 5, each of the first keycaps 20 comprises at least one first abutting portion 21, and each of the second keycaps 30 comprises at least one second abutting portion 31. In this embodiment, two sides of the first keycap 20 respectively have one first abutting portion 21, and similarly, two sides of the second keycap 30 respectively have one second abutting portion 31. In this embodiment, each of the first abutting portions 21 may be a flange extending from the first keycap 20, and each of the second abutting portions 31 may be a flange extending from the second keycap 30. In this embodiment, the first abutting portion 21 and the second abutting portion 31 are extending along the same direction (here, the X axis direction), but embodiments are not limited thereto.

As shown in FIGS. 2 to 6, the sliding plate 40 is parallel to the substrate 10. For example, in this embodiment, the sliding plate 40 is between the substrate 10 and the keycaps, and the sliding plate 40 is stacked on the upper surface 11 of the substrate 10. The sliding plate 40 is movable relative to the upper surface 11 of the substrate 10 along a sliding direction. The sliding plate 40 comprises a first guiding member 41 and a second guiding member 42 respectively arranged along the sliding direction.

Figure 4:
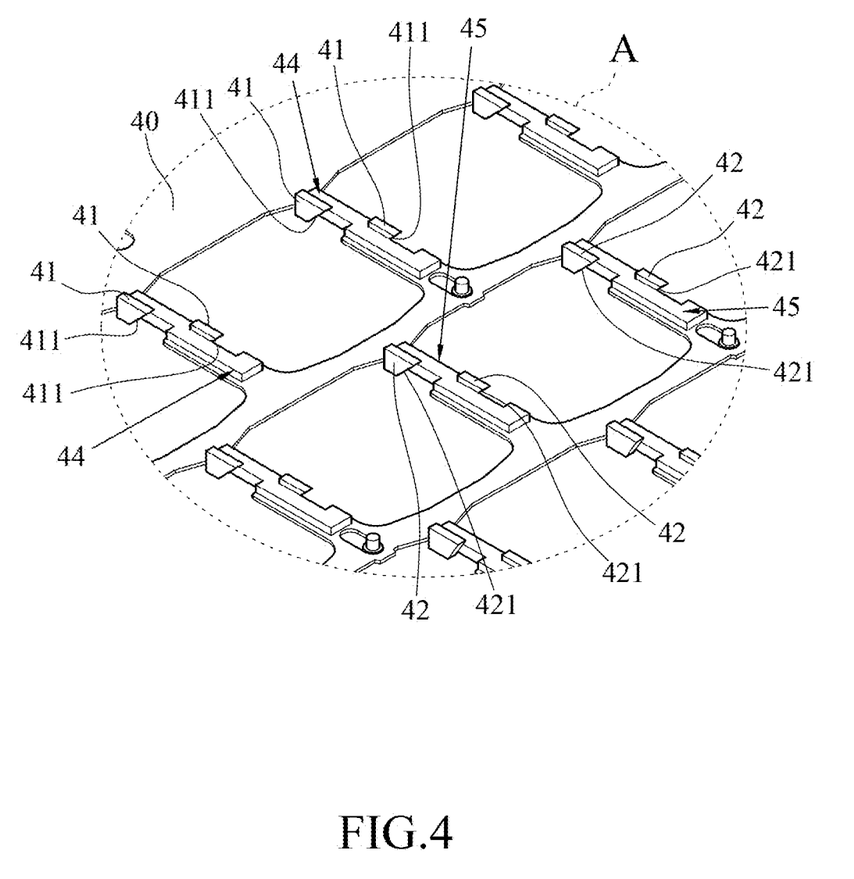
FIG. 4 illustrates an enlarged partial perspective view of a sinkable keyboard device according to an exemplary embodiment of the instant disclosure.

As shown in FIGS. 2 to 6, where FIG. 4 illustrates an enlarged partial view of the A region of FIG. 3. In this embodiment, the sliding plate 40 may comprise a plurality of via holes 43 for exposing the assembly structures 111 on the substrate 10, so that the assembly structures 111 can be assembled with the liftable connecting members 12 of the first keycaps 20 and the second keycaps 30. The sliding direction of the sliding plate 40 is perpendicular to the direction of each of the first abutting portions 21 and the direction of each of the second abutting portions 31. For example, in this embodiment, each of the first abutting portions 21 and each of the second abutting portions 31 are extending along the X axis direction, and the sliding plate 40 is movable relative to the upper surface 11 of the substrate 10 along the Y axis direction (i.e., the sliding direction in this embodiment). Furthermore, in this embodiment, the top surface of the sliding plate 40 comprises a plurality of first blocks 44, and each of the first blocks 44 is between adjacent two first keycaps 20. Each of the first blocks 44 has two first guiding members 41 and the two first guiding members 41 are at two opposite sides of the first block 44. The two first guiding members 41 correspond to the two first abutting portions 21 between adjacent two first keycaps 20. Each of the first guiding members 41 is arranged along the sliding direction of the sliding plate 40 (in this embodiment, the Y axis direction). One end of each of the first guiding members 41 near the first abutting portion 21 has a first inclined guiding surface 411, and a first inclined angle θ1 is between the first inclined guiding surface 411 and the upper surface 11. Similarly, the top surface of the sliding plate 40 comprises a plurality of second blocks 45, and each of the second blocks 45 is between adjacent two second keycaps 30. Each of the second blocks 45 has two second guiding members 42, and the two second guiding members 42 are at two opposite sides of the second block 45. Each of the second guiding members 42 is also arranged along the sliding direction of the sliding plate 40 (in this embodiment, the Y axis direction). One end of each of the second guiding members 42 near to the second abutting portion 31 has a second inclined guiding surface 421, and a second inclined angle θ2 is between the second inclined guiding surface 421 and the upper surface 11. Moreover, the first inclined angle θ1 of each of the first inclined guiding surfaces 411 is different from the second inclined angle θ2 of the corresponding second inclined guiding surface 421. For example, the first inclined angle θ1 may be greater than or less than the second inclined angle θ2.

Accordingly, because the first inclined angle θ1 of the first inclined guiding surface 411 of each of the first guiding members 41 on the sliding plate 40 is different from the second inclined angle θ2 of the second inclined guiding surface 421 of the corresponding second guiding member 42 on the sliding plate 40, when the sliding plate 40 is moved relative to the substrate 10 along the sliding direction, the first abutting portion 21 of each of the first keycaps 20 and the second abutting portion 31 of each of the second keycaps 30 respectively abut against the first inclined guiding surface 411 and the second inclined guiding surface 421 at different times. Therefore, the first keycaps 20 and the second keycaps 30 are moved downwardly toward the substrate 10 at different times. Related descriptions are provided as below with figures.

Figure 7:
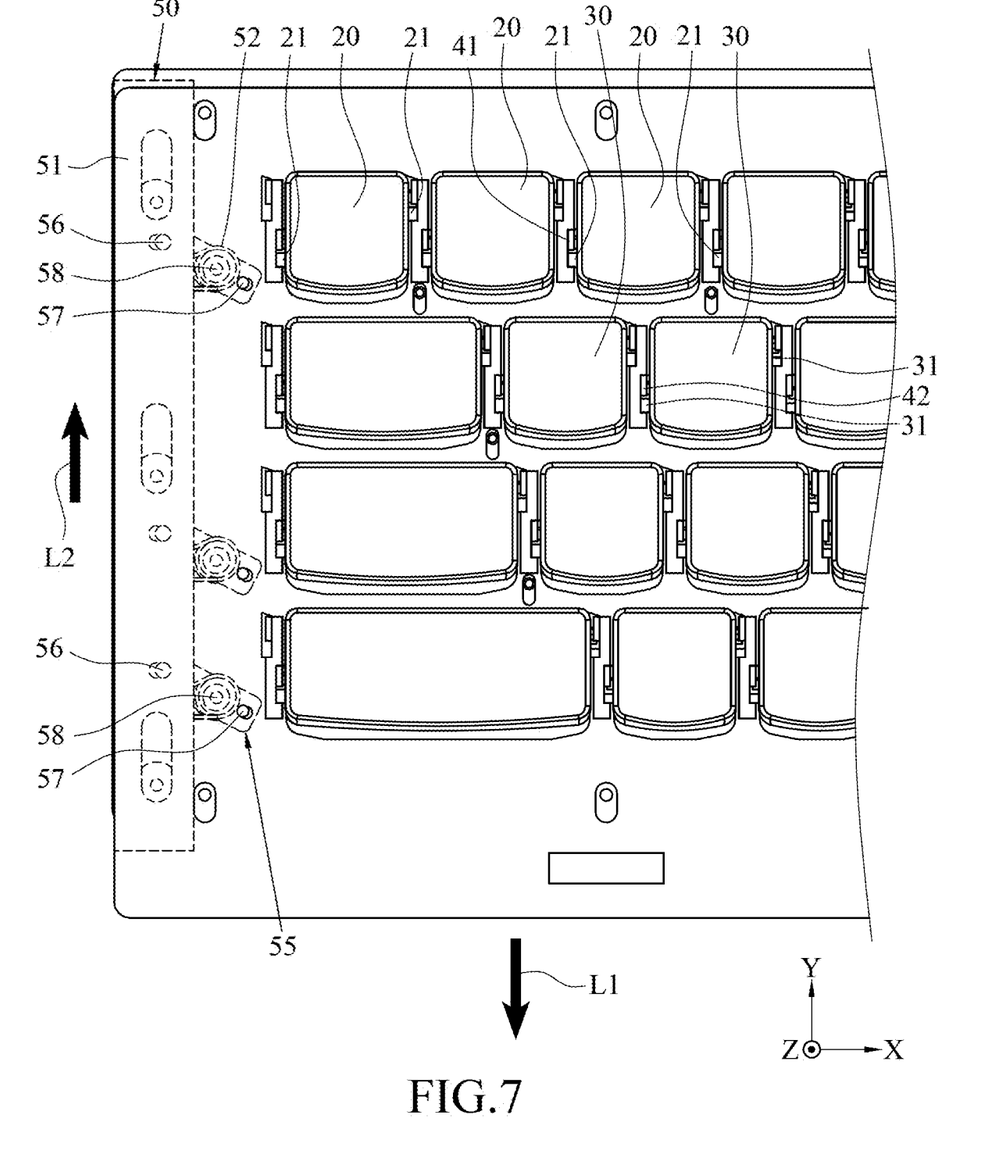
FIG. 7 illustrates a schematic operational view of a sinkable keyboard device according to an exemplary embodiment of the instant disclosure.
Figure 8:
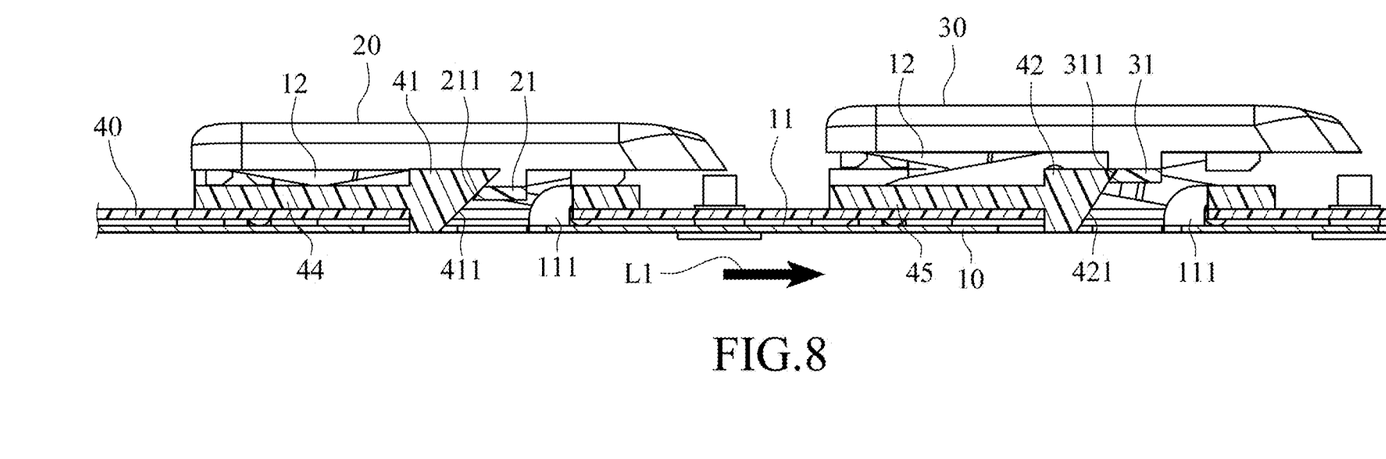
FIG. 8 illustrates a cross-sectional view showing the operation of a sinkable keyboard device according to an exemplary embodiment of the instant disclosure.
Figure 9:
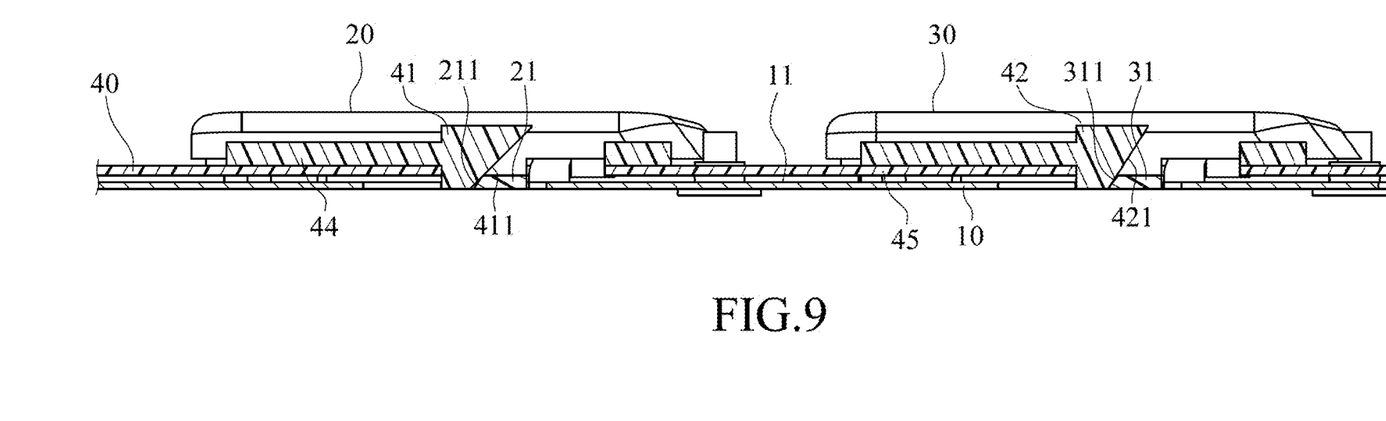
FIG. 9 illustrates a schematic view showing the sunken state of a sinkable keyboard device according to an exemplary embodiment of the instant disclosure.

As shown in FIGS. 5 and 6. In this embodiment, the first inclined angle θ1 of the first inclined guiding surface 411 of each of the first guiding members 41 is 45 degrees, and the second inclined angle θ2 of the second inclined guiding surface 421 of each of the second guiding members 42 is 57 degrees. Furthermore, when the keycap (for example, the first keycap 20 or the second keycap 30) of the sinkable keyboard device 1 is not pressed, the keycap is supported upwardly by an elastic member (e.g., an elastic rubber or an elastic sheet, not shown) below the keycap, so that the keycap is exposed from a cover plate 3 of the sinkable keyboard device 1 (as shown in FIGS. 1 and 6) for users operation. Moreover, as shown in FIGS. 7 and 8, when the sliding plate 40 is moved relative to the substrate 10 along a first direction (as indicated by the arrow L1), the first guiding member 41 moves toward the first abutting portion 21 of the first keycap 20, and the second guiding member 42 moves toward the second abutting portion 31 of the second keycap 30. The first inclined angle θ1 of the first inclined guiding surface 411 of each of the first guiding members 41 is less than the second inclined angle θ2 of the second inclined guiding surface 421 of the corresponding second guiding member 42. Therefore, as shown in FIGS. 8 and 9, when the sliding plate 40 is moved relative to the substrate 10 along the first direction, the first inclined guiding surface 411 firstly contacts the first abutting portion 21 of the first keycap 20, so that the first butting portion 21 abuts against the first inclined guiding surface 411 and slides along the first inclined guiding surface 411. Hence, the first keycaps 21 are pressed downwardly to come close to the substrate 10. At this moment, the sliding plate 40 bears the upward reaction force provided by the first keycaps 20. And then, when the sliding plate 40 further moves along the first direction (as indicated by the arrow L1), the second butting portion 31 abuts against the second inclined guiding surface 421 and slides along the second inclined guiding surface 421. Hence, the second keycaps 30 are pressed downwardly to come close to the substrate 10. At this moment, since the first keycaps 20 are already moved downwardly to greatly reduce the reaction force applied to the sliding plate 40, the most part of the reaction force applied to the sliding plate 40 comes from the second keycaps 30. Accordingly, when the sinkable keyboard device 1 is not in use, the keycaps are sunk downwardly and not protruding from the surface of the cover plate 3 to prevent the keycaps from being worn against by external forces or from being pressed unintentionally. Furthermore, the first abutting portion 21 of each of the first keycaps 20 and the second abutting portion 31 of each of the second keycaps 30 abut against the first inclined guiding surface 411 and the second inclined guiding surface 412 at different times, so that the reaction force applied to the sliding plate 40 can be distributed to different time periods, and the sliding plate 40 can be slid with less force.

As shown in FIG. 6, in one embodiment, a first distance D1 is between each of the first guiding members 41 and the corresponding first abutting portion 21, and a second distance D2 is between each of the second guiding members 42 and the corresponding second abutting portion 31. The first distance D1 may be different from the second distance D2. That is, according to practical requirements, the first distance D1 and the second distance D2 may be designed to be different, such that the timing for pressing and lowering each of the first keycaps 20 as well as the timing for pressing and lowering each of the second keycaps 30 can be changed. For example, in this embodiment, the first distance D1 between each of the first guiding members 41 and the corresponding first abutting portion 21 is less than the second distance D2 between each of the second guiding members 42 and the corresponding second abutting portion 31, but embodiments are not limited thereto.

In one embodiment, each of the first guiding members 41 and each of the second guiding members 42 may be plastic guiding members, and the sliding plate 40 may be a metal plate. For example, each of the first guiding members 41 and each of the second guiding members 42 may be formed on the sliding plate 40 by insert molding. Therefore, after the sliding plate 40 is used for a long-term period, the keycaps (such as the first keycaps 20 and the second keycaps 30) or other components of the keyboard are not worn easily to generate noises. Hence, the lifetime of the sinkable keyboard device 1 can be extended. In some embodiments, each of the first guiding members 41 and each of the second guiding members 42 may be formed on the sliding plate 40 by other processing techniques. Alternatively, each of the first guiding members 41, each of the second guiding members 42, and the sliding plate 40 may be integrally formed with each other, but embodiments are not limited thereto.

In some embodiments, as shown in FIGS. 6, 8, and 9, the first abutting portion 21 of each of the first keycaps 20 has a first inclined abutting surface 211, and the second abutting portion 31 of each of the second keycaps 30 has a second inclined abutting portion 311. When the sliding plate 20 slides relative to the substrate 10 along the first direction, the first inclined abutting surface 211 of each of the first keycaps 20 correspondingly abuts against the first inclined guiding surface 411 of the corresponding first guiding member 41, and the second inclined abutting surface 311 of each of the second keycaps 30 corresponding abuts against the second inclined guiding surface 421 of the corresponding second guiding member 42. Accordingly, each of the first keycaps 20 and the corresponding first guiding member 41 contact with each other by the inclined surfaces, each of the second keycaps 30 and the corresponding second guiding member 42 contact with each other by the inclined surfaces, so that the contact friction between the keycaps and the guiding members can be greatly reduced, and the sliding plate 40 can be slid with less force.

In some embodiments, the sliding plate 40 may be slid manually. Alternatively, the sliding plate 40 may be connected to a driving device 50, so that the driving device 50 drives the sliding plate 40 to move relative to the substrate 10 along the sliding direction. For example, as shown in FIGS. 3, 5, and 7, in this embodiment, the driving device 50 comprises a sliding bar 51 and a plurality of linking bars 55 (in this embodiment, the driving device 50 comprises three linking bars 55). The sliding bar 51 is assembled to one side of the sliding plate 40 and is slidable along the sliding direction (the Y axis direction shown in the figures). Each of the linking bars 55 comprises a first pivot portion 56, a second pivot portion 57, and a shaft portion 58 between the first pivot portion 56 and the second pivot portion 57. The shaft portion 58 of each of the linking bars 55 is fixedly assembled between the sliding plate 40 and the sliding bar 51. The first pivot portion 56 is pivotally connected to the sliding bar 51, and the second pivot portion 57 is pivotally connected to the sliding plate 40. Accordingly, as shown in FIGS. 5 and 7, when the sliding bar 51 slides along the sliding direction (the Y axis direction), the sliding bar 51 drives the sliding plate 40 to slide, so that each of the first guiding members 41 moves toward or away from the first abutting portion 21 of the corresponding first keycap 20 and each of the second guiding members 42 moves toward or away from the second abutting portion 31 of the corresponding second keycap 30. For example, in this embodiment, the sliding bar 51 slides along the second direction opposite to the first direction (e.g., the direction indicated by the arrow L2 shown in FIG. 7) to drive the first pivot portion 56 of each of the linking bars 55 to move along the second direction. Therefore, each of the linking bars 55 is rotated by taking the corresponding shaft portion 58 as the rotation center (in this embodiment, the linking bar 55 is rotated clockwise) so as to drive the second pivot portion 57 to move the sliding plate 40 along the first direction, thereby allowing the keycaps sinking downwardly. Conversely, when the sliding bar 51 slides along the first direction, the sliding bar 51 drives each of the linking bars 55 to rotate by taking the corresponding shaft portion 58 as the rotation center (in this embodiment, the linking bar 55 is rotated counterclockwise) so as to drive the sliding plate 40 to move along the direction indicated by the arrow L2, thereby allowing the keycaps to be recovered back into the unpressed condition for operation. In some embodiments, the driving devices 50 may be disposed at two opposite sides of the sliding plate 40, so that two driving devices 50 can be used to drive the sliding plate 40 to slide with less force.

Accordingly, as shown in FIGS. 1, 5, and 6, in the case that the slidable keyboard device 1 with the driving device 50 is applied to a notebook computer 2, one end of the sliding bar 51 of the driving device 50 is connected to the hinge 4 of the notebook computer 2. Therefore, during the front cover of the notebook computer 2 with the display covers the back cover of the notebook computer with the sinkable keyboard device 1, the sliding bar 51 is driven to move along the direction indicated by the arrow L2 by the rotation of the hinges 4, thereby driving the sliding plate 40 to slide along the direction indicated by the arrow L1. Therefore, the keycaps sink downwardly, and the overall thickness of the covered notebook computer 2 can be reduced.

Figure 10:
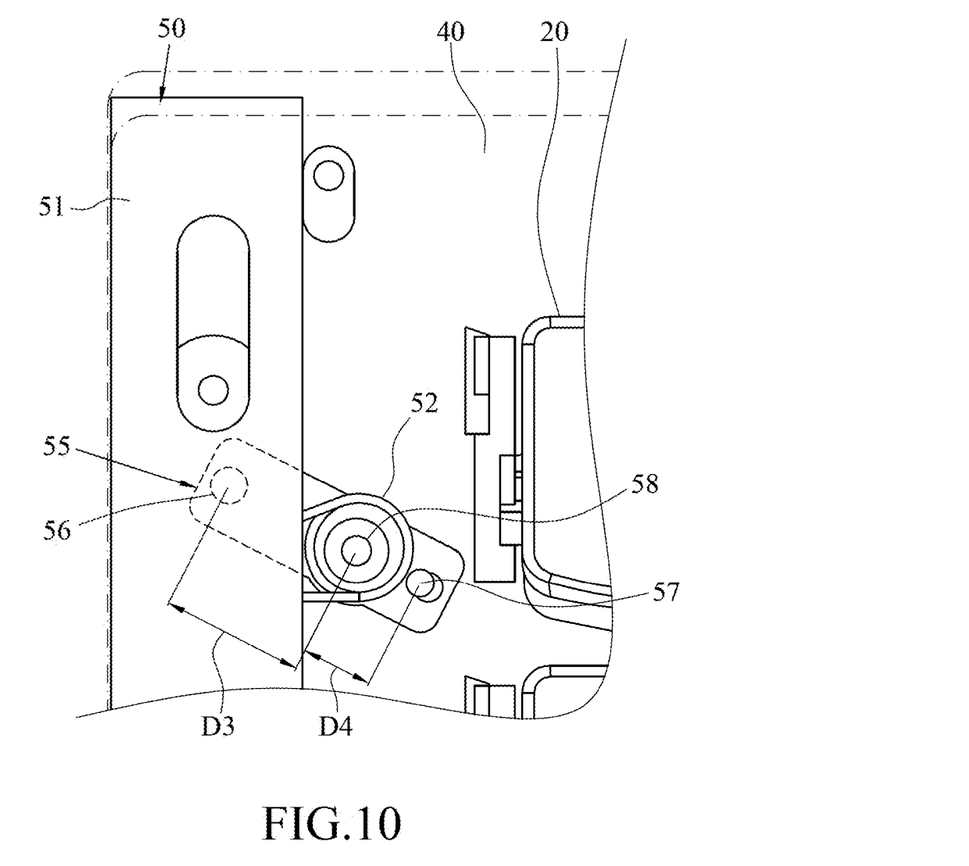
FIG. 10 illustrates an enlarged partial top view of a sinkable keyboard device according to an exemplary embodiment of the instant disclosure.

Furthermore, as shown in FIGS. 7 and 10, in one embodiment, for each of the linking bars 55, a length D3 from the first pivot portion 56 to the shaft portion 58 may be greater than a length D4 from the second pivot portion 57 to the shaft portion 58. Therefore, when the shift bar 51 slides, a larger torque can be generated and the shift bar 51 can be slid with less force.

Furthermore, as shown in FIGS. 3, 5, and 7, in one embodiment, each of the linking bars 55 is further connected to an elastic member 52, and the elastic member 52 provides an elastic force for moving the sliding bar 51 along the sliding direction (namely, the Y axis direction shown in the figures). For example, in this embodiment, the elastic member 52 is a torsion spring assembled on the shaft portion 58. One of two ends of the torsion spring is attached on the first pivot portion 56 of the linking bar 55, and the other end of the torsion spring may be attached on other supporting components (e.g., the cover plate 3). In one embodiment, when the sliding bar 51 slides toward the direction indicated by the arrow L2, the elastic member 52 is compressed to generate an elastic force against the sliding direction of the sliding bar 51 (namely, the elastic force applies toward the direction indicated by the arrow L1). Therefore, even if an excessive force is applied to the sliding plate 40, each of the first guiding members 41 of the sliding plate 40 can be prevented from directly impacting and damaging the first abutting portion 21 of each of the first keycaps 20, and each of the second guiding members 41 of the sliding plate 40 can be prevented from directly impacting and damaging the second abutting portion 31 of each of the second keycaps 30. Hence, the elastic member 52 provides a buffering effect for extending the lifetime of the sinkable mechanism. Conversely, when the slides bar 51 slides toward the direction indicated by the arrow L1, the resilient elastic force generated by the elastic member 52 facilitates the slide bar 51 to move with less force. Alternatively, in another embodiment, when the slide bar 51 slides toward the direction indicated by the arrow L1, the elastic member 52 is compressed to generate an elastic force against the sliding direction of the sliding bar 51 (namely, the elastic force applies toward the direction indicated by the arrow L2). Therefore, even if an excessive force is applied to the sliding plate 40, the sliding plate 40 can be prevented from directly impacting and damaging other components of the sinkable keyboard device 1. Hence, the elastic member 52 also provides a buffering effect for extending the lifetime of the sinkable mechanism. Conversely, when the slide bar 51 slides toward the direction indicated by the arrow L2, the resilient elastic force generated by the elastic member 52 facilitates the slide bar 51 to move with less force.

Figure 11:
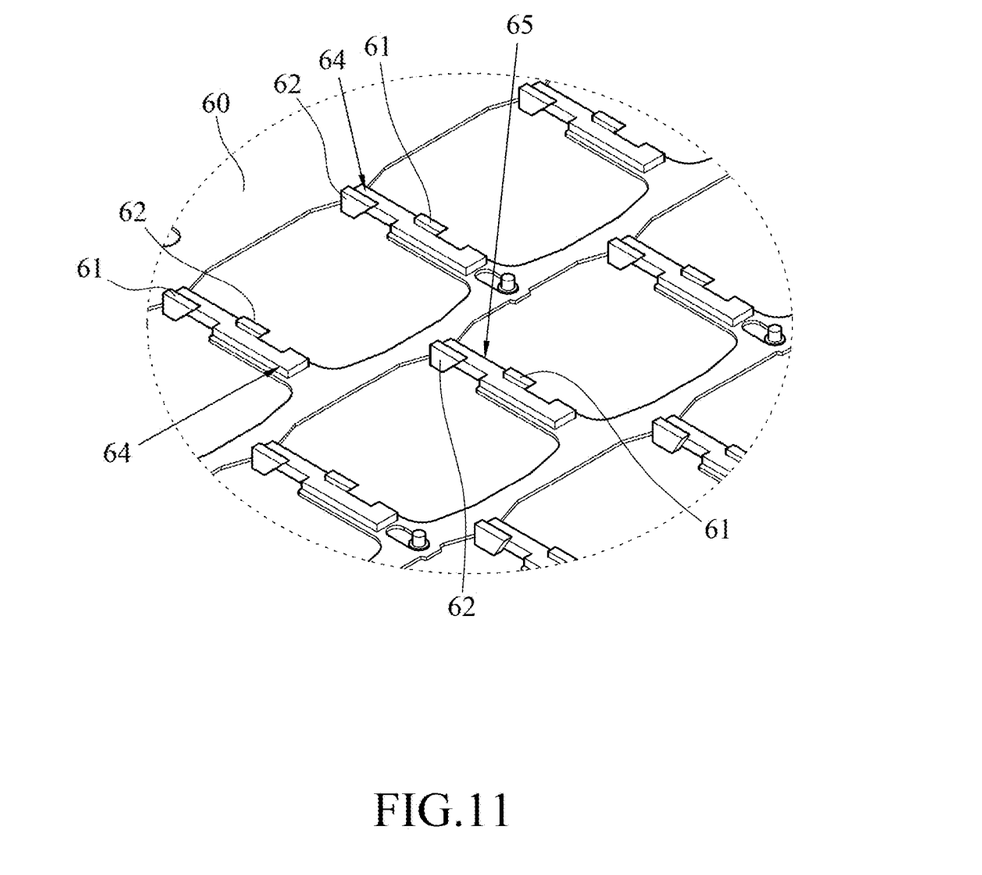
FIG. 11 illustrates an enlarged partial perspective view of a sinkable keyboard device according to another exemplary embodiment of the instant disclosure.

Please refer to FIG. 11. FIG. 11 illustrates an enlarged partial perspective view of a sinkable keyboard device 1 according to another exemplary embodiment of the instant disclosure. As compared with the embodiment shown in FIG. 4, in the embodiment shown in FIG. 11, two opposite sides of each of the first blocks 64 of the sliding plate 60 have a first guiding member 61 and a second guiding member 62, and the inclined angle of the first inclined guiding surface of the first guiding member 61 is different from the inclined angle of the second inclined guiding surface of the second guiding member 62. Similarly, two opposite sides of each of the second blocks 65 of the sliding plate 60 have a first guiding member 61 and a second guiding member 62, and the inclined angle of the first inclined guiding surface of the first inclined guiding member 61 is different from the inclined angle of the second inclined guiding surface of the second guiding member 62. Accordingly, when the sliding plate 60 slides relative to the substrate 10 along the sliding direction, each of the first guiding members 61 and the corresponding second guiding member 62 contact the first abutting portion 21 and the second abutting portion 31 of adjacent two keycaps at different timings, so that the adjacent two keycaps can be moved toward the substrate 10 at different timings, and the operation of the sinkable mechanism can be achieved with less force.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A sinkable keyboard device, comprising:
   a substrate having an upper surface;
   a first keycap liftably disposed on the upper surface of the substrate, wherein the first keycap comprises a first abutting portion;
   a second keycap liftably disposed on the upper surface of the substrate, wherein the second keycap comprises a second abutting portion; and
   a sliding plate parallel to the substrate, wherein the sliding plate is movable relative to the upper surface of the substrate along a sliding direction; the sliding plate comprises a first guiding member and a second guiding member arranged along the sliding direction; the first guiding member has a first inclined guiding surface, and a first inclined angle is between the first inclined guiding surface and the upper surface; the second guiding member has a second inclined guiding surface, and a second inclined angle is between the second inclined guiding surface and the upper surface; the first inclined angle is different from the second inclined angle;
   wherein when the sliding plate slides relative to the substrate along the sliding direction, the first abutting portion of the first keycap abuts against the first inclined guiding surface and slides along the first inclined guiding surface firstly, so that the first keycap moves downwardly to come close to the substrate, and then the second abutting portion of the second keycap abuts against the second inclined guiding surface and slides along the second inclined guiding surface, so that the second keycap moves downwardly to come close to the substrate.

2. The sinkable keyboard device according to claim 1, wherein a first distance is between the first guiding member and the first abutting portion, a second distance is between the second guiding member and the second abutting portion, and the first distance is different from the second distance.

3. The sinkable keyboard device according to claim 1, wherein the sliding plate is connected to a driving device, the driving device drives the sliding plate to slide relative to the substrate along the sliding direction.

4. The sinkable keyboard device according to claim 3, wherein the driving device comprises a sliding bar and a linking bar, the sliding bar is assembled to one side of the sliding plate, the linking bar comprises a first pivot portion, a second pivot portion, and a shaft portion between the first pivot portion and the second pivot portion, the shaft portion is fixedly assembled between the sliding plate and the sliding bar, the first pivot portion is pivotally connected to the sliding bar, and the second pivot portion is pivotally connected to the sliding plate.

5. The sinkable keyboard device according to claim 4, wherein a length from the first pivot portion to the shaft portion is greater than a length from the second pivot portion to the shaft portion.

6. The sinkable keyboard device according to claim 4, wherein the linking bar is further connected to an elastic member, and the elastic member provides an elastic force toward the sliding direction.

7. The sinkable keyboard device according to claim 6, wherein the elastic member is a torsion spring assembled at the shaft portion.

8. The sinkable keyboard device according to claim 1, wherein the first abutting portion comprises a first inclined abutting surface correspondingly abutting against the first inclined guiding surface, and the second abutting portion comprises a second inclined abutting surface correspondingly abutting against the second inclined guiding surface.

9. The sinkable keyboard device according to claim 1, wherein the sliding plate is a metal plate, and the first guiding member and the second guiding member are plastic guiding members.

10. The sinkable keyboard device according to claim 1, wherein the first keycap and the second keycap are arranged adjacently, and the first guiding member and the second guiding member are between the first keycap and the second keycap.

* * * * *